United States Patent [19]

Paganini et al.

[11] 4,453,267
[45] Jun. 5, 1984

[54] SIGNAL COMPRESSION APPARATUS AND METHOD

[75] Inventors: Bruno J. Paganini, Centerville, Ohio; Jeram G. Advani, Miami, Fla.; Robert M. Whitely; William J. Hale, both of Dayton, Ohio

[73] Assignee: NCR Corporation, Dayton, Ohio

[21] Appl. No.: 271,713

[22] Filed: Jun. 8, 1981

Related U.S. Application Data

[62] Division of Ser. No. 21,851, Mar. 19, 1979, Pat. No. 4,308,522.

[51] Int. Cl.³ ............................................. G06K 9/00
[52] U.S. Cl. ........................................ 382/29; 382/56; 358/260
[58] Field of Search ..................... 382/21, 29, 56, 57; 358/260, 261, 262

[56] References Cited

U.S. PATENT DOCUMENTS

| | | | |
|---|---|---|---|
| 3,851,309 | 11/1974 | Kenney et al. | 382/29 |
| 3,925,760 | 12/1975 | Mason et al. | 382/57 |
| 4,020,463 | 4/1977 | Himmel | 340/146.3 AE |
| 4,028,674 | 6/1977 | Chuang | 340/146.3 SY |
| 4,055,756 | 10/1977 | Jolivet et al. | 364/725 |
| 4,143,357 | 3/1979 | Baver et al. | 340/146.3 SY |
| 4,156,230 | 5/1979 | Riganati et al. | 382/21 |
| 4,277,776 | 7/1981 | Nally et al. | 382/29 |
| 4,286,255 | 8/1981 | Siy | 382/29 |

Primary Examiner—Leo H. Boudreau
Attorney, Agent, or Firm—J. T. Cavender; Albert L. Sessler, Jr.

[57] ABSTRACT

A method and apparatus are provided for digitizing an analog waveform and compressing the digitized information.

4 Claims, 8 Drawing Figures

| I | 1 | 2 | 3 | 4 | 5 | 6 | 7 | 8 |
|---|---|---|---|---|---|---|---|---|
| TABLE 1 | 9 | 27 | 0 | 0 | 15 | 3 | 13 | 0 |
| TABLE 2 | 1 | 9 | 12 | 13 | 15 | 18 | 19 | 21 |

SIGNAL COMPRESSION APPARATUS AND METHOD

CROSS-REFERENCE TO RELATED APPLICATION

This is a division of application Ser. No. 021,851, filed Mar. 19, 1979, now U.S. Pat. No. 4,308,522.

BACKGROUND OF THE INVENTION

The need for security in systems utilized in various types of financial, governmental, retail, manufacturing and other establishments, in order to prevent use of the system, or entry into the system, by unauthorized parties is a current and pressing problem. One solution to the problem is to provide reliable means to verify that the party requesting use of, or entry into, the system is, in fact, the person he or she claims to be. For the purpose of verifying the identity of an individual, some unique personal characteristics such as, for example, facial features, fingerprints, voice patterns or signature of the individual may be employed.

One suitable characteristic is the force pattern of an individual's signature. Systems have been developed which are capable of distinguishing between a forged signature and a valid signature on this basis. This may be accomplished by detecting individually distinctive force characteristics of a signature to be tested and converting them into electrical signals which can be automatically processed and compared with the stored representation of an authentic signature, for determination of whether or not the tested signature is a valid one.

A number of United States Patents have issued which are directed to signature verification, including Nos. 3,480,911; 3,579,186; 3,618,019; 3,818,443; 3,859,515; 3,906,444; 3,959,769; 3,962,679; 3,983,535; 4,028,674; 4,035,769; 4,040,011; 4,040,012; and 4,086,567.

A continuing need exists for signature verification systems which provide increased accuracy, reliability and speed of operation. The system which is the subject of the present invention offers a novel arrangement which is readily and conveniently implemented to provide compression of analog signals, which may be used in development of signature vectors which enable comparisons to be carried out for the purpose of verification with a high degree of accuracy.

SUMMARY OF THE INVENTION

This invention relates to a system for compression of an analog waveform.

In accordance with one of the embodiments of the invention, apparatus for providing a compressed digitized representation of an analog signal comprises means for sampling the analog signal at a predetermined rate to provide a plurality of corresponding digital values; storage means for storing each digital value in a first location until the next digital value has been sampled; means for comparing each latest digital value with the preceding digital value to determine a slope direction; means for comparing each most recently determined slope direction with the immediately preceding slope direction; and means for causing each preceding digital value to be discarded if the two slope directions are the same, and to be stored in a second location if the slope directions are different; whereby a digital representation, including stored digital values which represent signal maximums and minimums, of the analog signal is provided in the second storage location.

In accordance with another embodiment of the invention, a method of providing a compressed digitized representation of an analog signal comprises the steps of (A) sampling the analog signal at a predetermined rate to provide a plurality of corresponding digital values and associated time-related values; (B) storing each digital value in a first location until the next digital value has been sample; (C) comparing the latest digital value with a preceding digital value to determine a slope direction; (D) storing the preceding digital value and the associated time-related value in a second location if the slope directions are different; and (E) repeating steps B to D inclusive for each consecutive sampled digital value derived from sampling the analog signal, whereby a digital representation, including maximum and minimum values, of the analog signal is provided in the second storage location.

It is accordingly an object of the present invention to provide a method and apparatus for providing a compressed digitized representation of an analog signal.

A further object is to provide a method and apparatus for providing a compressed digitized representation of a signature.

With these and other objects, which will become apparent from the following description, in view, the invention includes certain novel features of construction and combinations of parts, one form or embodiment of which is hereinafter described with reference to the drawings which accompany and form a part of this specification.

DESCRIPTION OF THE PREFERRED EMBODIMENT

Figure 1:
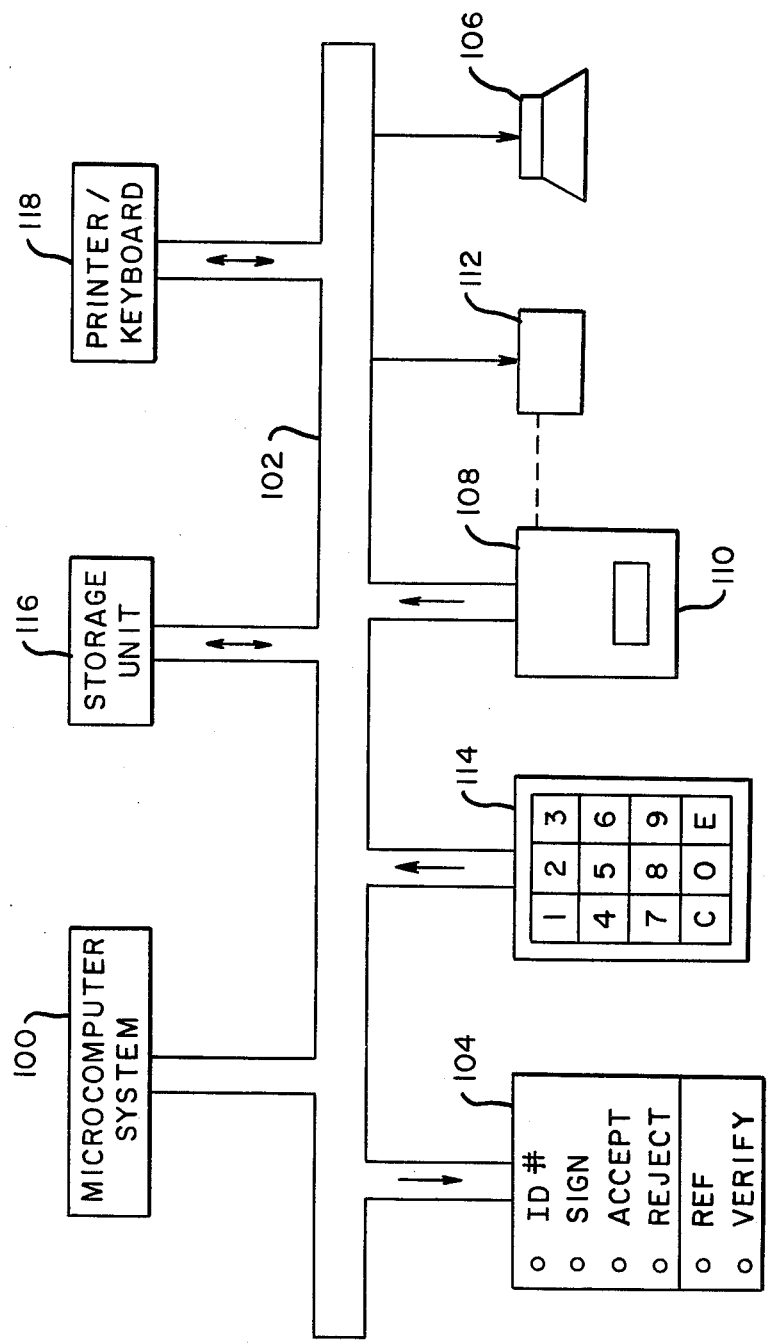
FIG. 1 is a block diagram showing the hardware components of the signature verification system of the present invention.

Referring now to the drawing, a signature verification system is shown in block form in FIG. 1. This system comprises a central processor unit 100, which includes a suitable microcomputer system, such as, for example, an Intel SBC 80/10 microcomputer system. The unit 100 controls, by means of a software operating system, the input-output peripheral units which are connected to a common data bus 102 and also contains all algorithms and performs all computations required for the personal verification system.

Figure 4:
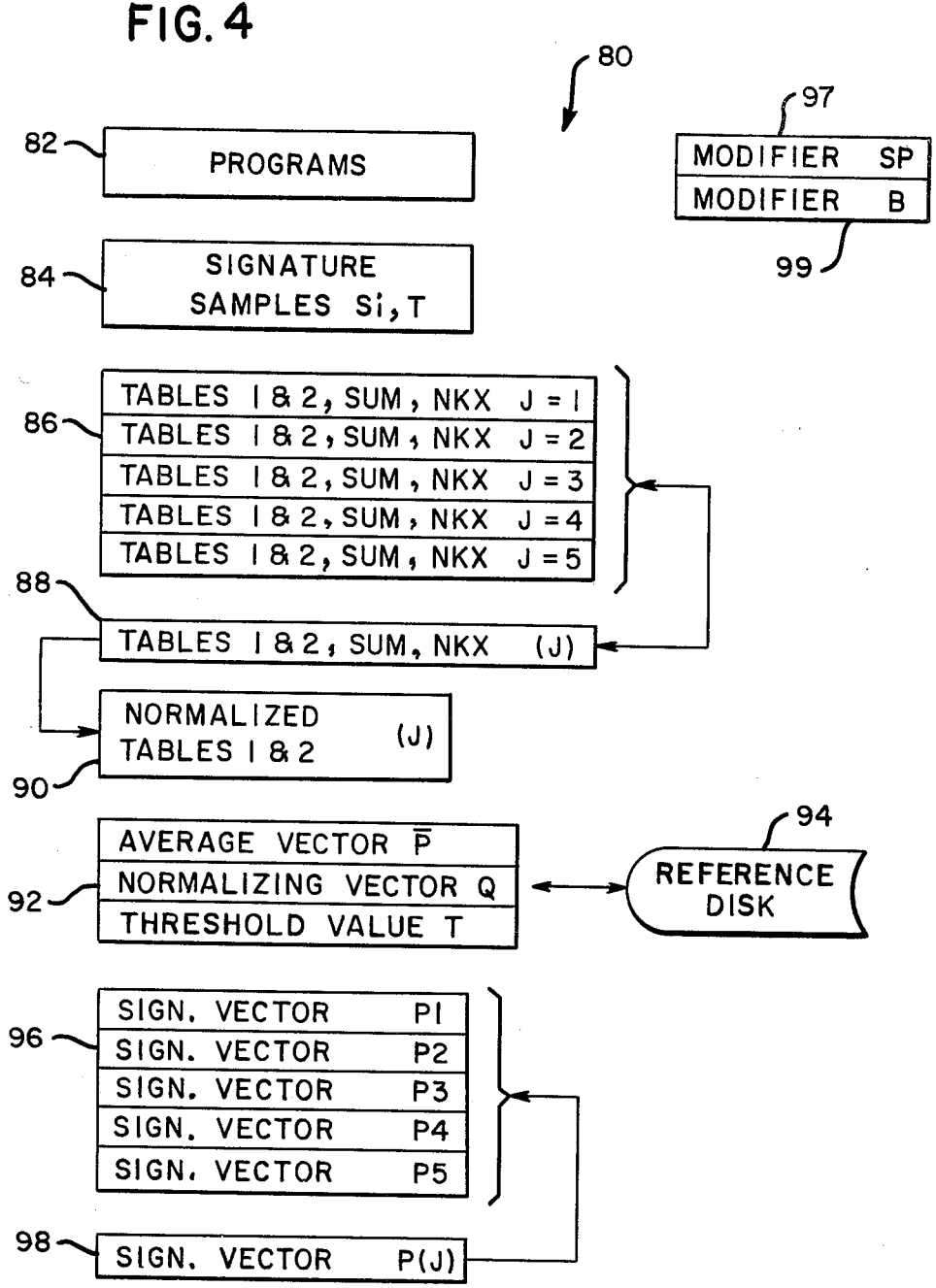
FIG. 4 is a diagrammatic showing of various memory locations contained in the memory of the microcomputer system and the associated "secondary" storage units.

The unit 100 includes a memory 80, a partial map of which is shown in FIG. 4. Included in said memory are a location 82 for storage of programs during operation, a location 84 for storage of data representing signatures or other handwritten data made for reference or verification purposes by customers, a location 86 for storing data representing five different signature samples, a common storage location 88 in which the data for the individual signature tables is collected, a location 90 used in performing normalizing operations, a location 92 for receiving reference signature data to be used in verification operations from a storage location 94 in "secondary" storage unit 116, and initially calculating such data for storing in location 94 of storage unit 116, a location 96 in which signature vectors for five signatures are stored, and a common storage location 98 which is used in generation of the individual signature vectors. As used herein, the term "signature vector" refers to a digital representation of certain defined characteristics of a handwriting sample, which may be a signature, but is not limited to such. The term "information vector" could be used in place of "signature vector", if desired.

A plurality of customer interface units are provided to enable the customer to perform the required actions for verification of identity, and to guide the customer in performing the necessary actions in the proper sequence.

A first such unit connected to the data bus 102 is the lead-through unit 104, which provides instructions to the customers as to the sequence of operations to be followed. The various indicators and their significance are tabulated below:

| | |
|---|---|
| ID # | Enter identity claim number |
| SIGN | Sign on signature pad |
| ACCEPT | Positive verification |
| REJECT | Negative verification |
| REF | System is in reference mode |
| VERIFY | System is in verify mode |

A second unit connected to the data bus 102 which may be employed as a speaker 106 which provides an audible tone each time that a signature is required by the system.

An additional unit connected to the data bus 102 is the signature pad unit 108 on which the customer executes the signature to be verified. A window 110, located above a force-sensitive surface, over which a record medium for receiving the signature travels, defines the signing area, and an associated paper feed mechanism 112, also connected to the data bus 102, advances the record medium after the signature has been completed. Any suitable signature pad structure may be employed, with one such suitable unit being disclosed in the U.S. Pat. No. 4,143,357, issued Mar. 6, 1979, inventors Donald W. Baver et al., and assigned to the assignee of the present application. Any suitable means may be employed for compensation for drift of the signature table or pad from a null position, one such method and apparatus being disclosed in the co-pending application Ser. No. 016,677, filed Mar. 1, 1979, inventor Robert M. Whitely, now U.S. Pat. No. 4,254,469, issued Mar. 3, 1981, and assigned to the assignee of the present application.

Another unit connected to the data bus 102 is a key pad 114, by means of which information, such as a customer identification number, can be entered into the system. In the illustrated embodiment, the key pad unit contains twelve keys, including ten digits, one "clear" and one "enter" key.

In addition to the customer interface units described above, two other units are connected to the data bus 102 in the illustrated embodiment.

One of these is a storage unit 116, which in the illustrated embodiment takes the form of a dual drive diskette which is used to store information required by the system, such as standards generated from the signatures of those customers who have been made a part of the system, programs for the system, and associated information utilized in performing the operations for which the system is designed.

Another unit is a printer/keyboard unit 118, which may be used to input commands, to load programs from the storage unit 116, and to provide means for outputting the results of transactions performed on the system, as for example during testing operations.

The operating system software provides two operating modes: reference and verification.

The reference mode is utilized for enrollment of a person into the system so that his identity can be verified by the system at subsequent times whenever desired. If the reference mode, an ID claim number is assigned for each customer, a number (five in the illustrated embodiment) of signatures are requested by the system and are made by the customer, a "standard" or "reference" is generated by the system from the five signatures, and the standard is stored in the storage unit 116 for later accessing by the ID number in subsequent verification of customer identity.

In the verification mode of operation, a customer enters his or her ID number into the system via the key pad unit 114, the standard for such ID number is fetched from location 94, a signature is requested by the system through the lead-through unit 104, the signature is made by the customer on the signature pad unit 108, the signature is compared to the standard, and the result is displayed on the unit 104. It will be recognized that the customer ID number could be entered into the system by other means than manual keying, such as, for example, a transaction card on which the ID number is stored magnetically, optically or by other means. Multiple tries, up to a predetermined number, may be permitted by the system if desired.

Figure 2A:
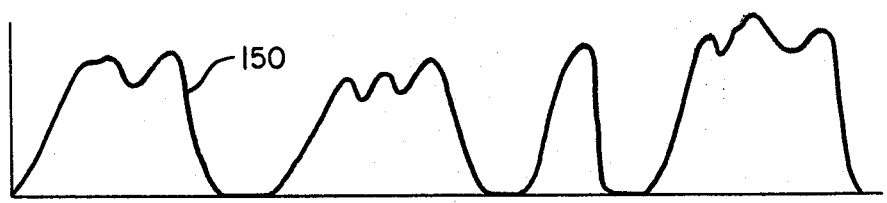
FIGS. 2A and 2B show waveform representations of a signature at various stages of processing by the system.
Figure 2B:
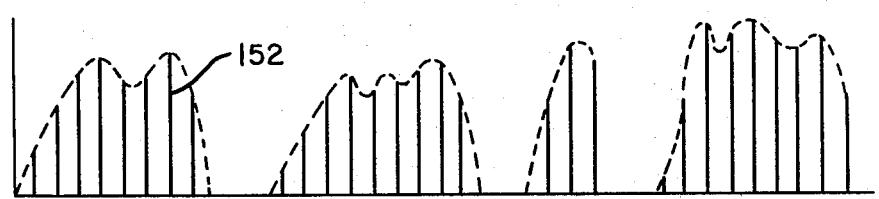

A significant aspect of the system described herein is the generation of signature vectors from the signing of signatures by the customer on the signature pad 108, such signature vectors being used in both the reference and verification modes. The action of the writing instrument on the writing surface produces a force versus time relationship which is translated by the unit 108 into a voltage versus time relationship. A graphical representation of a typical signature is shown in FIG. 2A, with time represented by the horizontal coordinate and voltage by the vertical coordinate. The waveform 150 of FIG. 2A is then digitized by sampling it at a predetermined rate, which may typically be one hundred samples per second, as represented by the vertical lines 152 in FIG. 2B. Thus if making a signature takes seven seconds, there will be a total of seven hundred samples. The amplitudes of the samples thus derived are stored in memory.

The stored signature data is processed to achieve a data compression of the digitized samples. If desired, this processing could be done in real time, rather than from storage, as is done in the illustrated embodiment.

Figures 5A, 5B:
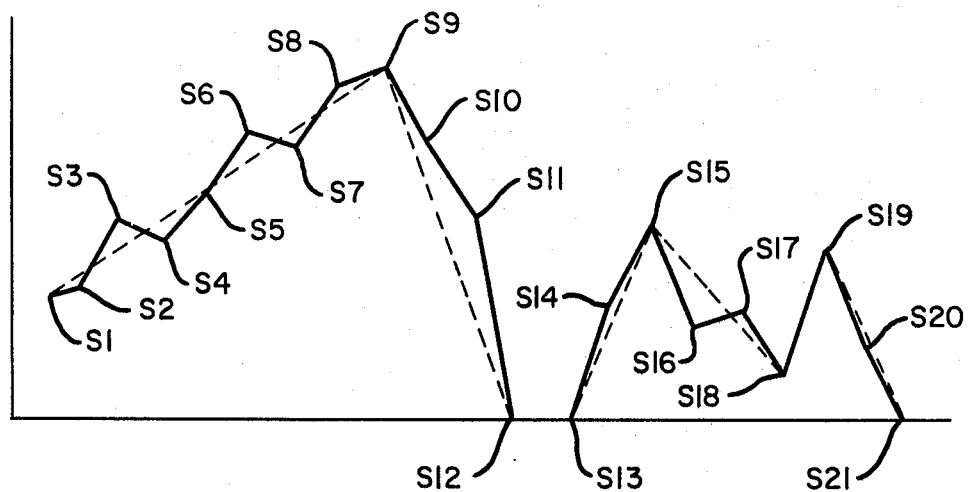
FIG. 5A is a diagrammatic showing of a digitized representation of a typical signature or segment thereof.
FIG. 5B is a table showing compressed values of data representing the waveform of FIG. 5A.

The flow diagram of FIGS. 3A and 3B sets forth the sequence of operations performed by the system of the present invention in generating a compressed table of values for each signature from which a signature vector can be computed in accordance with another sequence of operations, to be subsequently described. The flow diagram of FIGS. 3A and 3B will be described in association with reference to FIGS. 5A and 5B, which is an illustrative waveform representing a portion of a signature, not corresponding to the waveform of FIGS. 2A and 3B. A total of twenty-one sampling points are represented in FIG. 5A, with the sample number corresponding to one of the twenty-one equal time divisions, and the corresponding point on the waveform representing a voltage amplitude. Certain of the sample numbers are indentified by the designation S1, S2, etc.

Processing and compression of the signature data involves the determination of maximum and minimum points in the signature waveform and measurements of certain time characteristics of the signature. In order to be selected as a maximum or a minimum point, a sample value must not only reflect a change of sign in the slope of the waveform, as defined later, but must also differ in value from the preceding sample by more than a given threshold amount.

Figure 3A:
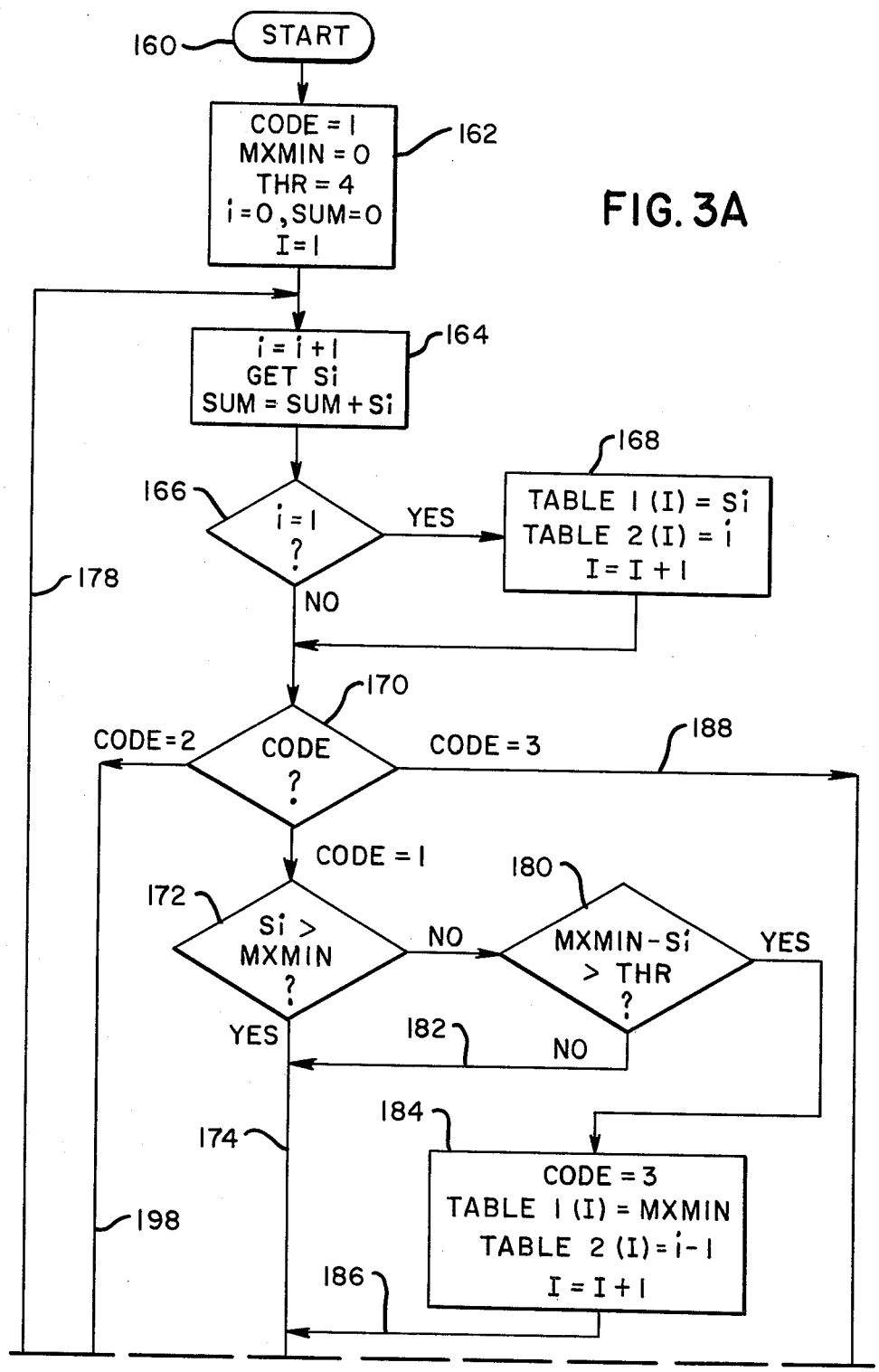
FIGS. 3A and 3B together form a detailed flow diagram of the sequence of operations performed by the system in generating a compressed table of values for each signature.
Figure 3B:
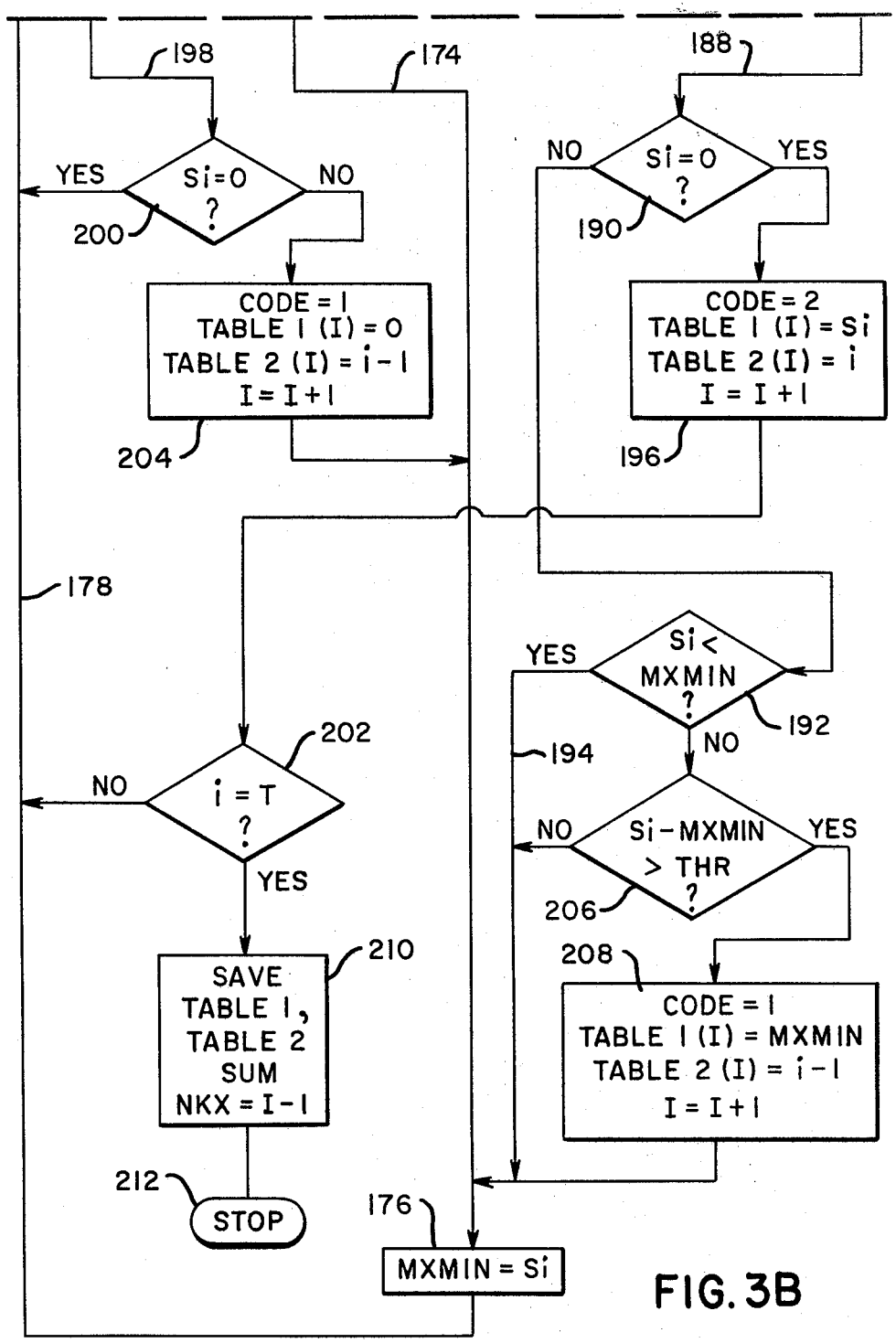

Referring to FIGS. 3A and 3B, it may be noted that $S_i$ represents the digitized value of the "ith" sample of the waveform. The value "i" represents the time, in number of samples, since the start of a signature. "MXMIN" represents the last maximum or minimum sample value maintained in storage. The values assigned to CODE are employed to describe certain waveform conditions during the operation. A value of one assigned to CODE means that the slope of the waveform is positive ($S_{i+1} > S_i$); a value of two assigned to CODE means that the sample value $S_i$ is 0; and a value of three assigned to CODE means that the slope of the waveform is negative ($S_{i+1} < S_i$).

In commencing the data compression operation from the START block 160 of FIG. 3A, a number representing the magnitude of the first sample $S_i$ is stored in TABLE 1 of the memory location 88 (FIG. 5), represented by block 168 of FIG. 3A, while the corresponding time (namely one) is stored in TABLE 2 of said memory location. It may be noted that the operation is commenced under the conditions set forth in block 162, namely CODE value set equal to 1; MXMIN value set equal to zero; a value of four assigned for the threshold THR; i, representing the sample number, is set equal to zero; and a SUM value, in which a cumulative total of sample magnitudes is maintained for the purpose of generating one of the values to be used in determining a signature vector, is set equal to zero. The value I, representing the entry number in TABLE 1 and TABLE 2, is set to one.

As shown in block 164, the system increments the value of i by one for each sample, fetches the corresponding sample value from memory location 84, and accumulates a running sum of sample magnitudes, which can be used in calculating a signature vector. Since i = 1 at the beginning of the operation, the sample amplitude value $S_1$ is stored as the first entry (I equals 1) in TABLE 1, and the i value of 1, representing sample time, is stored as the first entry in TABLE 2 of memory location 88. The value I is then incremented by one, as shown in block 168. Th value I is now equal to two, as shown in block 168.

The first sample, for which i = 1, which is fetched out of memory location 84, corresponds to point S1 on the waveform of FIG. 5A. System operation proceeds through decision blocks 170, 172 and over path 174 and said first sample is stored, as shown in block 176 (FIG. 3B) in an appropriate memory location (not shown) in memory 80 by virtue of the fact that the system is in CODE 1 condition and that the sample value exceeds MXMIN, which was initially set to zero.

The system then operates through a loop which includes path 178. The next sample, corresponding to point S2 on the waveform of FIG. 5A, is then routed through decision blocks 166, 170 and 172 of FIG. 3A, it being noted that S2 is greater in amplitude than the previous MXMIN of sample S1, and over path 174, and is stored in memory 80 in place of the previous stored S1 sample as the new MXMIN, as shown in block 176. Processing of samples continues with sample S3, which is greater in amplitude than previous sample S2, and which is stored in its place as the new MXMIN.

The fourth sample S4, which is less in magnitude than sample S3, as shown in FIG. 5A, is next processed. As a consequence of its comparison with MXMIN in block 172, it is then tested, as shown in block 180, to determine whether it is lesser in amplitude than MXMIN by a factor exceeding the previously established threshold of four. Since it is not, system operation loops back over path 182 to path 174, and sample S4 is then stored as the new MXMIN, in place of the previously stored S3. The system then loops back over path 178 to receive the next sample, as previously described.

The same sequence of operations as described above continues as samples S5 to S9 inclusive are processed by the system. In each case, the new sample replaces the previous sample as MXMIN, as represented in block 176.

When sample S10 is processed, it is substantially lower in amplitude than MXMIN as determined in block 172, and is therefore tested in block 180. Since MXMIN exceeds S10 by more than the threshold of four, processing continues as shown in block 184, in which the CODE is changed from 1 to 3, and the previous MXMIN (corresponding to S9) is stored in TABLE 1 of the selected memory location 88, as the second entry (I is two) in that table, while i minus 1 (which equals 9) is stored in TABLE 2, also as the second entry. The value of I is then incremented by one, assuming a value of three. System operation then loops back over path 186 to path 174, and sample S10 is stored as the new MXMIN, in place of the previously stored S9. The system then loops back over path 178 to receive the next sample.

When sample S11 is processed, the CODE is now 3, and processing therefore proceeds over path 188 to decision block 190 (FIG. 3B) for a determination of whether or not the magnitude of sample S11 equals zero. Since it does not, processing continues to decision block 192, where the sample S11 is compared to the MXMIN, and found to be lesser in magnitude, so that processing continues along path 194 and sample S11 is stored in place of the current MXMIN, as shown in block 176.

Sample S12 is then processed through blocks 170 and 190, and since its magnitude is equal to zero, processing continues as shown in block 196. The CODE is changed from 3 to 2, zero is stored as the third entry (I equals three) in TABLE 1 of memory location 88, representing the magnitude of sample S12, and 12 is stored as the third entry in TABLE 2 representing the sample time. The value I is incremented by 1, to four. Operation continues to block 202, where the current value of i is compared to the total number of samples T. As it is not equal to the total number of samples T, operation of the system then loops back over path 178 to receive the next sample.

Since CODE is equal to two, and sample S13 is also zero in magnitude, processing proceeds from block 170 over path 198, to block 200, and the processing loop returns to block 164 to receive the next sample.

Since sample S14 has a positive amplitude, system processing continues from block 200 to block 204, where the code is changed from 2 to 1, zero is stored as the fourth entry in TABLE 1, and thirteen (14-1) is stored as the fourth entry in TABLE 2, representing the sample time; I is incremented by one, so that I equals five. Processing proceeds over path 174 and the amplitude of sample S14 is stored as MXMIN, as shown in block 176, after which the system loops over path 178 to receive the next sample.

It may be noted that the interval between the two zeroes stored in TABLE 1, as measured by the sample times stored in TABLE 2, represents a "pen lift" during the signature process, such as may take place between the signing of first and last names, or between a name and an initial.

Processing of samples S15 and S16 is accomplished in the manner previously described, resulting in the storage of the amplitude $S_i$ and time i of sample S15, in TABLE 1 and TABLE 2 respectively for I=5. Similarly, the processing of samples S17 and S18 is carried on. When sample S19 is processed, the system follows the CODE 3 path 188 from block 170 through decision blocks 190, 192 and 206 to perform the functions set forth in block 208. The CODE is changed from 3 to 1; the MXMIN value, corresponding to the amplitude of sample S18, is stored in TABLE 1, and the sample time value of 18 is stored in TABLE 2. Thereafter the amplitude of sample S19 is stored as MXMIN.

Samples S20 and S21 are then processed in the manner described above. Let it be assumed that sample S21 represents the end of the signature, so that sample amplitude thereafter equals zero for the required one hundred ninety-two samples. It will be seen that sample S21 will cause the CODE to be changed from 3 to 2; zero is stored as the Ith entry in TABLE 1 of memory location 88, representing the magnitude of sample S21, and 21 is stored as the Ith entry in TABLE 2, representing the sample time. The value I is incremented by one. Operation proceeds to decision block 202. This time the value i is equal to the total number of samples T, at which time the system functions as shown in block 210, to save the current amounts stored in TABLE 1 and TABLE 2, the number of entries NKX, and the sum of the sample magnitudes SUM, by shifting them from memory location 88 to the appropriate location in the memory area 86, and to stop, as shown in block 212.

TABLE 1 and TABLE 2 are thus loaded in location 88 to store the compressed significant information concerning the signature just made, and these tables, when shifted to location 86, can then be employed to derive a signature vector which can be used in either the reference or the verification mode of operation of the system.

FIG. 5B shows TABLE 1 and TABLE 2 entries corresponding to the waveform of FIG. 5A for the various entries $I_1$ to $I_8$. For this waveform NKX equals eight, and SUM equals 253, which represents the sum of all of the values of $S_i$ and i equals 1 to i equals 21.

Included as an attached appendix is a listing in Intel 8080 assembly language for the following functions:

| | |
|---|---|
| lines 1–39 | comments |
| lines 40–98 | data definition |
| lines 99–164 | initialization of hardware and data areas |
| lines 165–230 | generate audible tone, turn "sign" light on and sample signature table for first sample of signature waveform |
| lines 231–435 | correspond to flow charts of FIGS. 3A and 3B |
| lines 436–481 | define data areas |

While the form of the invention shown and described herein is admirably adapted to fulfill the objects aforesaid, it is to be understood that other and further modifications of the disclosed method and apparatus within the scope of the following claims may be made without departing from the spirit of the invention. For example, an implementation to be utilized in a system having relatively lower security requirements might omit certain portions of the processing procedures disclosed herein.

```
LOC    OBJ    SEQ                    SOURCE STATEMENT

1 ;  TITLE          'KXSM SBR WITH ALERT TONE (KXSAT.SRC),
               2
               3 ;  SBC 80/10, 8-BIT A/D, 8253 TIMER-INTERRUPT,
               4 ;  SUCCESSIVE-SAMPLE DECISION ALGORITHM,
               5 ,  ALERT TONE GENERATION...
               6
               7 ;  KXSM SUBROUTINE HAS OPTIONS SELECTED BY FLAGS,
                    'INFL',
               8 ;  AND 'SAVFL', (REFER TO 'GLOBAL EQUATES') AS FOLLOWS:
               9
              10 ;  INFL = 01:  SAMPLES ARE FETCHED FROM THE I/O BUFFER,
              11 ;              IOBUF, WHICH MUST BE LOADED WITH DESIRED
```

```
              12 ;             SIGNATURE SAMPLES PRIOR TO CALLING.
              13
              14 ; INFL = 00:  SAMPLES ARE INPUT FROM THE A/D CONVERTER
              15
              16 ; NOTE: FOR ALL OPTIONS, THE KXSM MATRIX IS CONSTRUC-
                      TED
              17
              18
              19
              20
              21 ; ABNORMAL RETURNS ARE CODED IN THE ACCUMULATOR
              22 ; AS FOLLOWS:
              23
              24 ; CODE   CARRY              SIGNIFICANCE
              25 ; ----   -----   ---------------------------------------
              26 ;  02      0     SIGNATURE TOO SHORT    (NON FATAL)
              27 ;  03      0     SIGNATURE TOO LONG     (NON FATAL)
              28 ;  04      0     KXSM TABLE FULL        (NON FATAL)
              29
              30
              31 ; NOTE: THE DATA BUS TO THE ANALOG INTERFACE
              32 ;       CARD IS INVERTED, THUS ALL DATA OUTPUT
              33 ;       FROM THE CPU MUST BE COMPLEMENTED...
              34
              35 ;       THE A/D OUTPUT IS COMPLEMENTED BINARY,
              36 ;       THUS A/D INPUT TO THE CPU MUST NOT
              37 ;       BE COMPLEMENTED...
              38
              39
4300          40         ORG     4300H
              41
              42
              43 ; GLOBAL EQUATES...
              44
7EE3          45 INFL    EQU     7EE3H      ; 'INPUT' FLAG MEMORY
                                              LOCATION
7ED9          46 LCW     EQU     7ED9H      ; LED CONTROL WORD LOCATION
              47
              48 ; LOCAL EQUATES...
              49
00C0          50 ECNT    EQU     192D       ; SIGNATURE END COUNT
05DC          51 MAXCT   EQU     1500D      ; MAXIMUM NUMBER OF SAMPLES
0040          52 MINCT   EQU     64D        ; MINIMUM NUMBER OF SAMPLES
0004          53 THR     EQU     04         ; THRESHOLD VALUE
```

```
0080            54 MAXNE    EQU    128D
000A            55 THLD2    EQU    0AH
                56
                57 ; INPUT PORT ASSIGNMENTS...
                58
0063            59 ADIN     EQU    63H           ; A/D DATA INPUT PORT
00E8            60 PADIN    EQU    0E8H          ; KEYPAD DATA INPUT PORT
                61
                62 ; OUTPUT PORT ASSIGNMENTS...
                63
00E9            64 DISPL    EQU    0E9H          ; LED DISPLAY PORT
                65
                66
                67 ; 8253 COUNTER/TIMER EQUATES...
                68
0073            69 CTR0     EQU    73H           ; COUNTER NO. 0
0072            70 CTR1     EQU    72H           ; COUNTER NO. 1
0071            71 CTR2     EQU    71H           ; COUNTER NO. 2
0070            72 CTRCRL   EQU    70H           ; COUNTER CONTROL PORT
FFFE            73 OSCT     EQU    NOT 1         ; ONE-SHOT COUNT
AFFF            74 SCT      EQU    NOT 20480D    ; SAMPLING LOOP COUNT
FF37            75 TCT      EQU    NOT 200D      ; THRESHOLD LOOP COUNT
FFAD            76 TCMD1    EQU    NOT 01010010B ; MODE 1: CTR NO. 1
FFEB            77 TCMD2    EQU    NOT 00010100B ; MODE 2: LOAD 1 BYTE
FFCB            78 TCMD3    EQU    NOT 00110100B ; MODE 2: LOAD 2 BYTES
                79
                80 ; 8255 PPI EQUATES...
                81
FFF6            82 EICMD    EQU    NOT 00001001B ; SET INTERRUPT F/F
FFF7            83 DICMD    EQU    NOT 00001000B ; RESET INTERRUPT F/F
FFF0            84 EADSC    EQU    NOT 00001111B ; ENABLE A/D STROBE CTR
FFF1            85 DADSC    EQU    NOT 00001110B ; DISABLE A/D STROBE CTR
FF4F            86 MDCMD    EQU    NOT 10110000B ; PORT A MODE 1 INPUT
0060            87 PPI3C    EQU    60H           ; PPI NO. 3 CONTROL PORT
                88
                89
                90 ; REFERENCED ROUTINES & SUBROUTINES...
                91
0F8E            92 CRLF     EQU    0F8EH         ; CRLF SBR IN MONITOR
0217            93 MNTR     EQU    0217H         ; MONITOR ENTRY POINT
0F8B            94 HILO     EQU    0F8BH         ; SBC 80 MONITOR SBR
0F97            95 CLRM     EQU    0F97H         ; 'CLEAR MEMORY' SBR
0F70            96 ERMSG    EQU    0F70H         ; 'ERROR MESSAGE' SBR
```

```
                    97
                    98
                    99 ; INITIALIZATION...
                   100
                   101
4300 F3            102 KXSM:     DI                      ; DISABLE INTERRUPTS
4301 210000        103           LXI     H,0000          ; CLEAR HL
4304 39            104           DAD     SP              ; GET SP IN HL
4305 220A7E        105           SHLD    SAVSP           ; SAVE STACK POINTER
4308 3EC9          106           MVI     A,(RET)         ; LOAD 'RET' OPCODE
430A 323D3C        107           STA     3C3DH           ; MOVE 'RET' OPCODE TO
                                                           'USRBR'
                   108
                   109 ; CLEAR KXSM TABLE AREA  (7210H - 73DFH)...
                   110
                   111 CLRTBL:
430D 211072        112           LXI     H,KXTBL         ; POINT TO STORAGE BEGINNING
4310 06D0          113           MVI     B,0D0H          ; LOAD COUNTER (208 BYTES)
4312 CD970F        114           CALL    CLRM            ; CLEAR 7210H - 72DFH
4315 CD970F        115           CALL    CLRM            ; CLEAR 72E0H - 73DFH
                   116
                   117 ; NOTE: THE ACCUMULATOR IS CLEARED BY THE 'CLRM'
                   118 ; SUBROUTINE CALLED ABOVE...
                   119
4318 211072        120           LXI     H,KXTBL         ; INITIALIZE KX POINTER
431B 22007E        121           SHLD    KXPTR
431E 21E072        122           LXI     H,SMTBL         ; INITIALIZE SM POINTER
4321 22047E        123           SHLD    SMPTR
4324 21BF62        124           LXI     H,IOBUF-1       ; INITIALIZE IOBUF POINTERS
4327 22067E        125           SHLD    INPTR           ;       "       "       "
432A 22087E        126           SHLD    OUTPTR          ;       "       "       "
432D 3AE37E        127           LDA     INFL            ; GET INPUT FLAG
4330 FE01          128           CPI     01              ; FETCH MEMORY SAMPLES?
4332 C23843        129           JNZ     IHDW            ; NO, INITIALIZE HARDWARE
4335 C39E43        130           JMP     FIRST           ; GO STORE & CONTINUE
                   131
                   132
                   133
                   134 ; INITIALIZE 8255 PPI ON ANALOG BOARD...
                   135
                   136 IHDW:
4338 3E4F          137           MVI     A,MDCMD         ; LOAD MODE COMMAND
433A D360          138           OUT     PP13C           ; INITIALIZE MODE 1 INPUT
                   139
```

```
                140 ; INITIALIZE 8253 COUNTER NO. 1 FOR
                141 ; ONE-SHOT MODE (MODE 1)...
                142
433C 3EAD       143         MVI     A,TCMD1 AND 0FFH ; LOAD COMMAND WORD
433E D370       144         OUT     CTRCRL
4340 3EFE       145         MVI     A,OSCT AND 0FFH  ; LOAD ONE-SHOT COUNT
4342 D372       146         OUT     CTR1
                147
                148 ; INITIALIZE 8253 COUNTER NO. 0 FOR
                149 ; APPROX. 100-MICROSECOND SAMPLING TIME...
                150
4344 3EEB       151         MVI     A,TCMD2 AND 0FFH ; LOAD COMMAND WORD
4346 D370       152         OUT     CTRCRL
4348 3E37       153         MVI     A,TCT AND 0FFH   ; LOAD COUNT BYTE
434A D373       154         OUT     CTR0
                155
                156
                157 ; ENABLE 8255 PPI INTERRUPT AND A/D STROBE COUNTER...
                158
434C 3EF6       159         MVI     A,EICMD AND 0FFH ; LOAD COMMAND WORD
434E D360       160         OUT     PPI3C            ; ENABLE PPI INTER-
                                                     RUPT
4350 3EF0       161         MVI     A,EADSC AND 0FFH ; LOAD COMMAND WORD
4352 D360       162         OUT     PPI3C            ; ENABLE A/D STROBE
                                                     CTR
                163
                164
                165 ; TONE GENERATION:  A SQUARE WAVEFORM IS
                166 ; GENERATED ON THE LSB OUTPUT LINE OF THE
                167 ; KEYPAD LED DISPLAY PORT (DISPL)...
                168
4354 3A2F45     169         LDA     TFREQ            ; GET TONE FREQUENCY CON-
                                                     STANT
4357 5F         170         MOV     E,A              ; SAVE TFREQ IN E
4358 2A3045     171         LHLD    TTIME            ; GET TONE TIME CONSTANT
435B 3AD97E     172         LDA     LOW              ; GET LED CONTROL WORD
435E E6DE       173         ANI     0DEH             ; MASK TO TURN-ON 'SIGN' LED
                174                                  ; AND SET LSB LINE LOW
4360 4F         175         MOV     C,A              ; SAVE MASKED LCW
                176
                177 TONE:
4361 79         178         MOV     A,C              ; PUT LCW MASK IN ACCUM.
4362 EE01       179         XRI     01               ; SWITCH LSB
4364 4F         180         MOV     C,A              ; AND SAVE MODIFIED MASK
```

```
4365 D3E9      181              OUT     DISPL       ; SWITCH PORT LSB LINE
4367 43        182              MOV     B,E         ; LOAD TFREQ INTO LOOP
                                                      CNTR.
               183
               184 ; THRESHOLD LOOP...
               185 ; (SAMPLING TIME APPROX. 100 MICROSECONDS)
               186
               187 TLOOP:
4368 DBE8      188              IN      PADIN       ; IS ESCAPE DESIRED?
436A 17        189              RAL
436B D27343    190              JNC     TL1         ; NO, CONTINUE
436E 3EFF      191              MVI     A,0FFH      ; YES, PUT CODE IN ACCUM.
4370 C3AC44    192              JMP     RSPPI       ; RESET PPI & RETURN
               193 TL1:
4373 FB        194              EI                  ; ENABLE INTERRUPT
4374 76        195              HLT                 ; WAIT FOR INTERRUPT
4375 DB63      196              IN      ADIN        ; GET KX(T) FROM A/D
4377 57        197              MOV     D,A         ; SAVE KX(T) IN D
4378 3A2E45    198              LDA     STHLD       ; GET STARTING THRESHOLD
437B BA        199              CMP     D           ; IS KX(T) > STHLD
437C DA8C43    200              JC      TLEX        ; YES, LEAVE TLOOP
               201
437F 7C        202              MOV     A,H         ; TEST FOR END OF TIME
4380 B5        203              ORA     L           ;   "    "   "   "  "
4381 CA6843    204              JZ      TLOOP       ; CONTINUE IN TLOOP ONLY
               205
4384 05        206              DCR     B           ; DECREMENT LOOP COUNT
4385 C26843    207              JNZ     TLOOP       ; CONTINUE
               208
4388 2B        209              DCX     H           ; DECREMENT TIME COUNT
4389 C36143    210              JMP     TONE        ; GO SWITCH LSB
               211
               212 TLEX:
438C 79        213              MOV     A,C         ; PUT LCW MASK IN ACCUM.
438D CD2445    214              CALL    SINOFF      ; 'SIGN' LIGHT OFF; LSB
                                                      LOW
               215
               216
               217 ; NOW, REINITIALIZE 8253 COUNTER NO. 0
               218 ; FOR APPROX. 10-MILLISECOND SAMPLING
               219 ; TIME...
               220 ; (20,480 COUNTS = 5000H = AFFFH COMP.)
               221
4390 3ECB      222              MVI     A,TCMD3 AND 0FFH ; LOAD COMMAND WORD
```

```
4392 D370     223              OUT     CTRCRL
4394 3EFF     224              MVI     A,SCT AND 0FFH   ; LOAD COUNT LBYTE
4396 D373     225              OUT     CTR0
4398 3EAF     226              MVI     A,SCT SHR 8      ; LOAD COUNT HBYTE
439A D373     227              OUT     CTR0
              228
439C DB63     229              IN      ADIN             ; RESET 8255 INTR LINE
              230
              231 ; NOTE: THE BC REGISTER PAIR IS DEDICATED AS THE
              232 ; SAMPLE COUNTER IN THE REMAINDER OF THE ROUTINE &
              233 ; MUST BE PROTECTED...
              234
              235
439E 3E01     236 FIRST:       MVI     A,01
43A0 32117E   237              STA     CODE             ; CODE=1
43A3 010000   238              LXI     B,00             ; I=0
43A6 AF       239              XRA     A
43A7 320E7E   240              STA     MXMIN            ; MXMIN=0
43AA 329172   241              STA     SUM
43AD 329272   242              STA     SUM+1            ; SUM=0
43B0 329372   243              STA     SUM+2
43B3 CDC144   244 GETSI:       CALL    GETS
43B6 F5       245              PUSH    PSW              ; SAVE SI
43B7 F5       246              PUSH    PSW
43B8 78       247              MOV     A,B
43B9 FE00     248              CPI     00
43BB C2F243   249              JNZ     CKCOA
43BE 79       250              MOV     A,C
43BF FE01     251              CPI     01
43C1 C2F243   252              JNZ     CKCOA
43C4 F1       253              POP     PSW
43C5 CD0045   254              CALL    IIS1
43C8 3A117E   255 CKCO:        LDA     CODE
43CB FE02     256              CPI     02
43CD CA3644   257              JZ      COD2
43D0 FE01     258              CPI     01
43D2 CA4F44   259              JZ      COD1
              260 COD3:
43D5 F1       261              POP     PSW
43D6 FE00     262              CPI     00
43D8 CAF643   263              JZ      CO3E
43DB 57       264 CO3F:        MOV     D,A              ; SI
43DC 3A0E7E   265              LDA     MXMIN
43DF BA       266              CMP     D
```

| | | | | | | |
|---|---|---|---|---|---|---|
| 43E0 | D2EB43 | 267 | | JNC | STSI | |
| 43E3 | 5F | 268 | CO3B: | MOV | E,A | |
| 43E4 | 7A | 269 | | MOV | A,D | |
| 43E5 | 93 | 270 | | SUB | E | |
| 43E6 | FE04 | 271 | | CPI | THR | |
| 43E8 | D22644 | 272 | | JNC | CO3C | |
| 43EB | 7A | 273 | STSI: | MOV | A,D | |
| 43EC | 320E7E | 274 | STSIB: | STA | MXMIN | |
| 43EF | C3B343 | 275 | | JMP | GETSI | |
| 43F2 | F1 | 276 | CKCOA: | POP | PSW | |
| 43F3 | C3C843 | 277 | | JMP | CKCO | |
| 43F6 | 3E02 | 278 | CO3E: | MVI | A,2 | |
| 43F8 | 32117E | 279 | | STA | CODE | |
| 43FB | AF | 280 | | XRA | A | |
| 43FC | CD0045 | 281 | | CALL | IIS1 | |
| 43FF | 3AE37E | 282 | | LDA | INFL | |
| 4402 | FE01 | 283 | | CPI | 01 | |
| 4404 | CA1544 | 284 | | JZ | CO3A | |
| 4407 | 2A067E | 285 | | LHLD | INPTR | ; HARDWARE |
| 440A | 22087E | 286 | | SHLD | OUTPTR | |
| 440D | 60 | 287 | | MOV | H,B | |
| 440E | 69 | 288 | | MOV | L,C | |
| 440F | 229472 | 289 | | SHLD | SCNT | |
| 4412 | C3B343 | 290 | | JMP | GETSI | |
| 4415 | 2ABC62 | 291 | CO3A: | LHLD | LSADR | |
| 4418 | EB | 292 | | XCHG | | |
| 4419 | 2A067E | 293 | | LHLD | INPTR | |
| 441C | 23 | 294 | | INX | H | |
| 441D | CD8B0F | 295 | | CALL | HILO | |
| 4420 | DA8344 | 296 | | JC | CO3D | |
| 4423 | C3B343 | 297 | | JMP | GETSI | |
| 4426 | 3E01 | 298 | CO3C: | MVI | A,01 | |
| 4428 | 32117E | 299 | | STA | CODE | |
| 442B | 3A0E7E | 300 | | LDA | MXMIN | |
| 442E | 0B | 301 | | DCX | B | |
| 442F | CD0045 | 302 | | CALL | IIS1 | |
| 4432 | 03 | 303 | | INX | B | |
| 4433 | C3EB43 | 304 | | JMP | STSI | |
| 4436 | F1 | 305 | COD2: | POP | PSW | ; GET SI |
| 4437 | FE00 | 306 | | CPI | 00 | |
| 4439 | CA6F44 | 307 | | JZ | CO2A | |
| 443C | 57 | 308 | | MOV | D,A | |
| 443D | AF | 309 | | XRA | A | |
| 443E | 329672 | 310 | | STA | ZCNT | |

| | | | | | | |
|---|---|---|---|---|---|---|
| 4441 | 3E01 | 311 | | MVI | A,01 | |
| 4443 | 32117E | 312 | | STA | CODE | |
| 4446 | AF | 313 | | XRA | A | |
| 4447 | 0B | 314 | | DCX | B | |
| 4448 | CD0045 | 315 | | CALL | IIS1 | |
| 444B | 03 | 316 | | INX | B | |
| 444C | C3EB43 | 317 | | JMP | STSI | |
| 444F | 3A0E7E | 318 | COD1: | LDA | MXMIN | |
| 4452 | 57 | 319 | | MOV | D,A | ; MXMIN=D |
| 4453 | F1 | 320 | | POP | PSW | |
| 4454 | BA | 321 | | CMP | D | |
| 4455 | D2EC43 | 322 | | JNC | STSIB | |
| | | 323 | | | | |
| 4458 | 92 | 324 | CO1A: | SUB | D | ; SI-MXMIN |
| 4459 | FE04 | 325 | | CPI | THR | |
| 445B | DAEC43 | 326 | | JC | STSIB | |
| 445E | 57 | 327 | | MOV | D,A | ; SI |
| 445F | 3E03 | 328 | | MVI | A,03 | |
| 4461 | 32117E | 329 | | STA | CODE | |
| 4464 | 3A0E7E | 330 | | LDA | MXMIN | |
| 4467 | 0B | 331 | | DCX | B | |
| 4468 | CD0045 | 332 | | CALL | IIS1 | |
| 446B | 03 | 333 | | INX | B | |
| 446C | C3EB43 | 334 | | JMP | STSI | |
| 446F | 3AE37E | 335 | CO2A: | LDA | INFL | |
| 4472 | FE01 | 336 | | CPI | 01 | |
| 4474 | CAB343 | 337 | | JZ | GETSI | |
| 4477 | 3A9672 | 338 | | LDA | ZCNT | |
| 447A | 3C | 339 | | INR | A | |
| 447B | 329672 | 340 | | STA | ZCNT | |
| 447E | FEC0 | 341 | | CPI | ECNT | |
| 4480 | DAB343 | 342 | | JC | GETSI | |
| 4483 | 3A9072 | 343 | CO3D. | LDA | NKX | |
| 4486 | D601 | 344 | | SUI | 01 | |
| 4488 | 329072 | 345 | | STA | NKX | |
| 448B | 3AE37E | 346 | | LDA | INFL | |
| 448E | FE01 | 347 | | CPI | 01 | |
| 4490 | CAC044 | 348 | | JZ | SBREX | |
| 4493 | 2A087E | 349 | | LHLD | OUTPTR | ; GET OUTPUT POINTER |
| 4496 | 22BC62 | 350 | | SHLD | LSADR | ; TRANSFER TO LSADR |
| 4499 | 2A9472 | 351 | | LHLD | SCNT | ; STORE SAMPLE COUNT |
| 449C | 22BE62 | 352 | | SHLD | T | ; STORE SAMPLE COUNT IN IOBUF |

```
449F  11C0FF     354            LXI    D,-MINCT         ; LOAD MINIMUM COUNT LIMIT
44A2  19         355            DAD    D                ; SCNT - MINIMUM LIMIT
44A3  3E02       356            MVI    A,02             ; LOAD ERROR CODE
44A5  D2A944     357            JNC    ABORT            ; SIGNATURE TOO SHORT
44A8  AF         358            XRA    A                ; CLEAR ACCUM. & CARRY
                 359
                 360  ABORT:
44A9  CD700F     361            CALL   ERMSG            ; TYPE ERROR MESSAGE
44AC  F5         362  RSPPI:    PUSH   PSW
44AD  3AD97E     363            LDA    LCW              ; GET LCW
44B0  CD2445     364            CALL   SINOFF           ; 'SIGN' OFF, LSB LO\
44B3  3EF7       365            MVI    A,DICMD AND 0FFH ; LOAD COMMAND WORD
44B5  D360       366            OUT    PPI3C            ; RESET INTERRUPT F/\
44B7  3EF1       367            MVI    A,DADSC AND 0FFH ; LOAD COMMAND WORD
44B9  D360       368            OUT    PPI3C            ; STOP A/D STROBE CT\
44BB  F1         369            POP    PSW
44BC  2A0A7E     370            LHLD   SAVSP
44BF  F9         371            SPHL
                 372
                 373  SBREX:
44C0  C9         374            RET                     ; TO CALLING ROUTINE
                 375
                 376  GETS:                              ; BLOCK 164 SUBROUTINE
44C1  3AE37E     377            LDA    INFL
44C4  FE01       378            CPI    01
44C6  CAE544     379            JZ     MEMSAV
44C9  2124FA     380            LXI    H,-MAXCT
44CC  09         381            DAD    B
44CD  3F         382            CMC
44CE  3E03       383            MVI    A,03
44D0  D2A944     384            JNC    ABORT
44D3  FB         385            EI
44D4  76         386            HLT
44D5  DB63       387            IN     ADIN             ; ACCUMULATOR
44D7  FE0A       388            CPI    THLD2
44D9  D2DD44     389            JNC    GETSA
44DC  AF         390            XRA    A
44DD  2A067E     391  GETSA:    LHLD   INPTR
44E0  23         392            INX    H
44E1  77         393            MOV    M,A
44E2  C3EA44     394            JMP    NOSAV
44E5  2A067E     395  MEMSAV:   LHLD   INPTR
44E8  23         396            INX    H
44E9  7E         397            MOV    A,M
```

```
44EA 22067E    398 NOSAV:   SHLD    INPTR
44ED 5F        399          MOV     E,A
44EE 1600      400          MVI     D,00
44F0 2A9172    401          LHLD    SUM
44F3 19        402          DAD     D
44F4 229172    403          SHLD    SUM
44F7 D2FE44    404          JNC     SKIPI
44FA 219372    405          LXI     H,SUM+2
44FD 34        406          INR     M
44FE 03        407 SKIPI:   INX     B
44FF C9        408          RET
               409 IIS1:                       ; BLOCK 168 SUBROUTINE
4500 2A007E    410          LHLD    KXPTR
4503 77        411          MOV     M,A
4504 23        412          INX     H
4505 22007E    413          SHLD    KXPTR
4508 2A047E    414          LHLD    SMPTR
450B 70        415          MOV     M,B
450C 23        416          INX     H
450D 71        417          MOV     M,C
450E 23        418          INX     H
450F 22047E    419          SHLD    SMPTR
4512 3A9072    420          LDA     NKX
4515 3C        421          INR     A
4516 329072    422          STA     NKX
4519 FE80      423          CPI     MAXNE
451B DA2345    424          JC      IIS10
451E 3E04      425          MVI     A,04
4520 C3A944    426          JMP     ABORT
               427 IIS10:
4523 C9        428          RET
               429 SINOFF:
4524 E6FE      430          ANI     0FEH        ; SET LSB LOW
4526 F620      431          ORI     20H
4528 D3E9      432          OUT     DISPL       ; DO IT
452A 32D97E    433          STA     LCW         ; STORE UPDATE LCW
452D C9        434          RET                 ; DONE
               435
               436
452E 0A        437 STHLD:   DB      0AH         ; STARTING THRESHOLD
452F 03        438 TFREQ:   DB      03H         ; TONE FREQUENCY CONSTANT
4530 0005      439 TTIME:   DW      0500H       ; TONE DURATION CONSTANT
               440
               441
```

```
                442 ; DEFINITION OF GLOBAL DATA AREAS...
                443
62BC            444             ORG     62BCH
                445
62BC 0000       446 LSADR:      DW      00              ; LAST SAMPLE ADDRESS
62BE 0000       447 T:          DW      00              ; SAMPLE COUNT
05DD            448 IOBUF:      DS      MAXCT+1         ; I/O BUFFER
                449
689C            450 BUFEND      EQU     $-1             ; END OF I/O BUFFER
                451
                452
7210            453             ORG     7210H
                454
0080            455 KXTBL:      DS      128D            ; KX TABLE
                456
7290 00         457 NKX:        DB      00              ; NR. ENTRIES IN MATRIX
0003            458 SUM:        DS      03              ; SUM OF SAMPLE VALUES
7294 0000       459 SCNT:       DW      00              ; SAMPLE COUNT
                460
7296 00         461 ZCNT:       DB      00              ; ZERO'S COUNT FOR PEN LIFT
                462
0049            463 MISC:       DS      73D
0100            464 SMTBL:      DS      256D            ; SM TABLE
73DF            465 SMEND       EQU     $-1             ; END OF SM TABLE
                466
                467
7E00            468             ORG     7E00H
                469
7E00 0000       470 KXPTR       DW      00              ; KX TABLE POINTER
7E02 0000       471 PLPTR:      DW      00              ; PEN-LIFT TABLE POINTER
7E04 0000       472 SMPTR:      DW      00              ; SM TABLE POINTER
7E06 0000       473 INPTR:      DW      00              ; INPUT POINTER
7E08 0000       474 OUTPTR:     DW      00              ; OUTPUT POINTER
7E0A 0000       475 SAVSP:      DW      00              ; STACK POINTER STORAGE
7E0C 0000       476 MAXVCT:     DW      00              ; MAXIMUM VALUE SAMPLE COUNT
7E0E 00         477 MXMIN:      DB      00              ; MINIMUM VALUE
7E0F 0000       478 MINVCT:     DW      00              ; MINIMUM VALUE SAMPLE COUNT
7E11 00         479 CODE:       DB      00
                480
                481 END                                 ; RMW
```

ASSEMBLY COMPLETE, NO ERRORS

We claim:

1. A method of providing a compressed digitized representation of an analog signal comprising the steps of
   A. sampling the analog signal at a predetermined rate to provide a plurality of corresponding digital values and associated sample values;
   B. storing each digital value in a first location until the digital value corresponding to the next sample has been determined;
   C. comparing digital values to determine slope directions and zero value intervals of the analog signal;
   D. discarding each non-zero preceding digital value so long as the latest slope direction is the same as the preceding slope direction;
   E. storing a preceding digital value and associated sample value in a second location following each slope change and commencement and termination of a zero value interval of the analog signal;
   whereby a compressed digitized representation of the analog signal is provided in the second storage location.

2. A method of providing a compressed digitized representation of a signature comprising the steps of
   A. generating an analog signal from the act of writing the signature;
   B. sampling the analog signal at a predetermined rate to provide a plurality of corresponding digital values and associated sample values;
   C. storing all of the digital values for a given signature in a first location;
   D. sequentially fetching each digital value from said first location;
   E. temporarily storing each fetched digital value in a second location until the digital value corresponding to the next sample has been determined;
   F. comparing digital values to determine slope changes and zero value intervals of the analog signal;
   G. discarding each non-zero preceding digital value so long as the latest slope direction is the same as the preceding slope direction; and
   H. storing a preceding digital value and associated sample value in a third location following each slope change and commencement and termination of a zero value interval of the analog signal;
   whereby a compressed digitized representation of the signature is provided in the third storage location.

3. Apparatus for providing a compressed digitized representation of an analog signal comprising
   means for sampling the analog signal at a predetermined rate to provide a plurality of corresponding digital values and associated sample values;
   means for storing each digital value in a first location until the digital value corresponding to the next sample has been determined;
   means for comparing digital values to determine slope changes and zero value intervals of the analog signal;
   means for discarding each non-zero preceding digital value so long as the latest slope direction is the same as the preceding slope direction; and
   means for storing a preceding digital value and associated sample value in a second location following each slope change and commencement and termination of a zero value interval of the analog signal;
   whereby a compressed digitized representation of the analog signal is provided in the second storage location.

4. Apparatus for providing a compressed digitized representation of a signature comprising
   means for generating an analog signal from the act of writing the signature;
   means for sampling the analog signal at a predetermined rate to provide a plurality of corresponding digital values and associated sample values;
   means for storing all of the digital values for a given signature in a first location;
   means for sequentially fetching each digital value from said first location;
   means for temporarily storing each fetched digital value in a second location until the digital value corresponding to the next sample has been determined;
   means for comparing digital values to determine slope changes and zero value intervals of the analog signal;
   means for discarding each non-zero preceding digital value so long as the latest slope direction is the same as the preceding slope direction; and
   means for storing a preceding digital value and associated sample value in a third location following each slope change and commencement and termination of a zero value interval of the analog signal;
   whereby a compressed digitized representation of the signature is provided in the third storage location.

* * * * *